United States Patent [19]
Yollin

[11] Patent Number: 5,990,866
[45] Date of Patent: Nov. 23, 1999

[54] POINTING DEVICE WITH INTEGRATED PHYSIOLOGICAL RESPONSE DETECTION FACILITIES

[75] Inventor: Guy D. Yollin, 17433 Brookhurst Dr., Lake Oswego, Oreg. 97034

[73] Assignee: Guy D. Yollin, Lake Oswego, Oreg.

[21] Appl. No.: 09/123,715

[22] Filed: Jul. 28, 1998

Related U.S. Application Data

[60] Provisional application No. 60/054,485, Aug. 1, 1997.

[51] Int. Cl.[6] ..................................................... G09G 5/08
[52] U.S. Cl. ............................................. 345/157; 463/36
[58] Field of Search ..................................... 345/156, 157; 463/36; 340/825.19; 341/21; 600/485, 500, 544–547, 549, 587

[56] References Cited

U.S. PATENT DOCUMENTS

| 4,293,855 | 10/1981 | Perkins . |
| 4,575,591 | 3/1986 | Lugaresi . |
| 5,034,574 | 7/1991 | Martovitz . |
| 5,402,150 | 3/1995 | Stiles . |
| 5,406,957 | 4/1995 | Tansey . |
| 5,428,369 | 6/1995 | Pranger et al. . |
| 5,474,082 | 12/1995 | Junker . |
| 5,539,861 | 7/1996 | DeSimone . |
| 5,556,107 | 9/1996 | Carter . |
| 5,571,057 | 11/1996 | Ayers . |
| 5,581,484 | 12/1996 | Prince . |
| 5,741,217 | 4/1998 | Gero . |

OTHER PUBLICATIONS

PCT Search Report, Nov. 19, 1998, 4 pgs, for PCT application No. PCT/US98/15973.

*Primary Examiner*—Jeffery Brier
*Attorney, Agent, or Firm*—Blakely Sokoloff Taylor & Zafman, LLP

[57] ABSTRACT

A pointing device is disclosed comprising a motion translation unit and one or more physiological response sensors. The motion translation unit identifies and communicates changes in the position of the pointing device to a communicatively coupled host system. In accordance with the teachings of the present invention, the one or more physiological response sensors measure and communicate physiological response information of a user of the pointing device to the host system. In accordance with a second aspect of the present invention, a host system incorporating the teachings of the present invention utilizes physiological response information to modify the operating environment of the host system to suit the physiological state of the host system user.

18 Claims, 8 Drawing Sheets

| PHYSIOLOGICAL SCOPE 602 | BACKGROUND 604 | SCREEN SAVER 606 | AUDIO SELECTIONS 608 |
|---|---|---|---|
| 609 1 | FLYING BIRDS | FIRE IN FIREPLACE | PLACID BUBBLING BROOK 614 |
| 616 ••• 5 ••• | ••• DEFAULT ••• | ••• DEFAULT ••• | ••• DEFAULT ••• |
| 618 10 | SAILING 620 | SKIING 622 | ROCK CONCERT EXCERPTS 624 |

STRESSED

LETHARGIC

FIG. 6

POINTING DEVICE WITH INTEGRATED PHYSIOLOGICAL RESPONSE DETECTION FACILITIES

RELATED APPLICATIONS

This non-provisional application claims priority to provisional application No. 60/054,485, filed on Aug. 1, 1997 for a "Hand-Held Pointing Device with Integrated Biofeedback Sensor" by Guy D. Yollin.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise expressly reserves all rights whatsoever in said copyright works.

BACKGROUND OF THE INVENTION

1. Field of the Invention

The present invention relates to the field of control devices and, in particular, to a pointing device with integrated physiological response detection facilities.

2. Background Information

Pointing devices facilitating user control of a communicatively coupled host system are well known in the art, and typically include such devices as a mouse, a joystick, a computer stylus, an electronic pen, an x-y tablet and the like. Those familiar with such devices will appreciate that prior art pointing devices typically provide two dimensional motion information as well as signals from momentary contact push-buttons. That is, prior art pointing devices merely provide for the manual control of the host operating environment by providing positional change information and user selection information. Accordingly, such prior art pointing devices are generally limited to the manual control of a pointing icon, e.g., a cursor, on the computer display, and to the selection of objects displayed within the graphical user interface of the host system.

Physiological response sensors which detect and measure certain physiological attributes of an individual are also known. Once relegated to sophisticated medical equipment, novelty computer applications relying on input from such physiological response sensors have recently been introduced. One example of just such a novelty "biofeedback" system is the Aura Video Station from Inneractive Inc., which was introduced at the COMDEX '98 trade show in Chicago. The Aura Video Station is generally comprised of a computer system having a pointing device and a separate physiological response input device. Specialized, novelty software provided with the system uses the physiological response information to provide the user with biofeedback information. The Aura Video Station is typical of prior art biofeedback systems in that (a) they require a separate dedicated physiological response input device that consumes a valuable I/O port of the computer system, and (b) the system relies on a specialized dedicated program which merely provides the user with biofeedback information for purposes of entertainment or self-diagnosis. None of the prior art systems rely on physiological response information for purposes of computer system control via a general operating system.

Thus, an improved method and apparatus for controlling a host system with physiological response information that does not consume excess I/O ports is needed, unencumbered by the inherent limitations and deficiencies commonly associated with the prior art. Accordingly, a pointing device with integrated physiological response detection facilities will be described below, in accordance with the teachings of the present invention.

SUMMARY OF THE INVENTION

In accordance with the teachings of the present invention, a method and apparatus for controlling a host system with physiological response information is presented. In accordance with a first aspect of the present invention, a pointing device is disclosed comprising a motion translation unit and one or more physiological response sensors. The motion translation unit identifies and communicates changes in the position of the pointing device to a communicatively coupled host system. In accordance with the teachings of the present invention, the one or more physiological response sensors measure and communicate physiological response information of a user of the pointing device to the host system. In accordance with a second aspect of the present invention, a host system incorporating the teachings of the present invention utilizes physiological response information to modify the operating environment of the host system to suit the physiological state of the host system user.

BRIEF DESCRIPTION OF DRAWINGS

The present invention will be described by way of exemplary embodiments, but not limitations, illustrated in the accompanying drawing in which like references denote similar elements, and in which:

FIG. 6 graphically illustrates a database correlating physiological response information to modifiable attributes of an operating environment, in accordance with one embodiment of the present invention.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers and configurations are set forth in order to provide a thorough understanding of the present invention. However, it will also be apparent to those skilled in the art that the present invention may be practiced without these specific details. In other instances, well known features are omitted or simplified for clarity.

Figure 1:
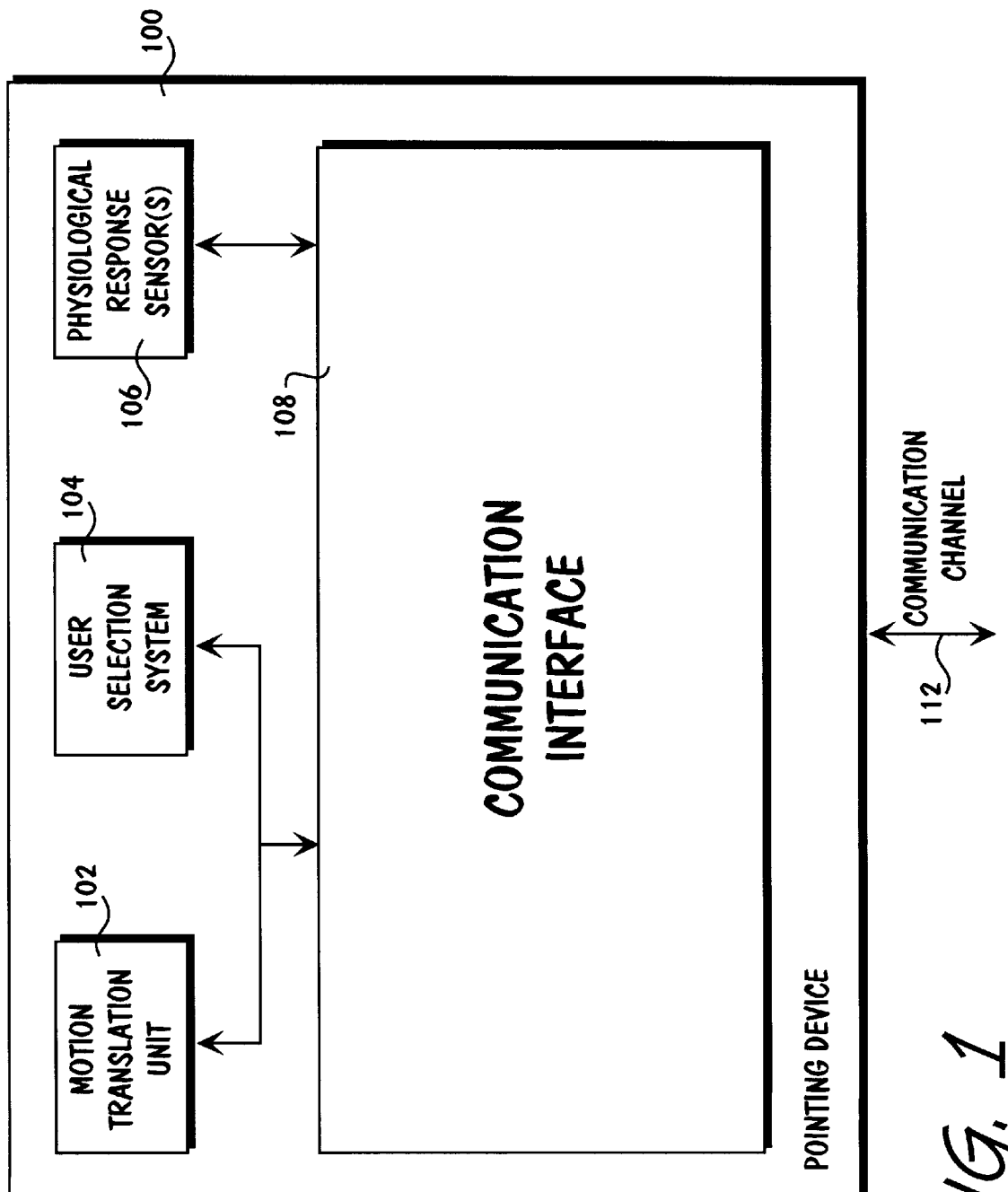
FIG. 1 illustrates a block diagram of a hand-held pointing device incorporating the teachings of the present invention, in accordance with one embodiment of the present invention.

Turning first to FIG. 1, a first aspect of the present invention is illustrated in the block diagram of example pointing device 100, in accordance with one embodiment of the present invention. In accordance with this first aspect of the present invention, to be described more fully below, pointing device 100 includes one or more physiological response sensors 106 enabling pointing device 100 to provide a communicatively coupled host system with physiological response information of the user of the host system, in addition to the positional change information typical of prior art pointing devices. Those skilled in the art will appreciate, given the teachings of the present invention, that pointing device 100 incorporating the teachings of the present invention facilitates a whole new era in computer control, which is a second aspect of the present invention. In accordance with this second aspect of the present invention, to be described more fully below, a host system incorporating the teachings of the present invention automatically modifies its operating environment based, at least in part, on physiological response information received from a pointing device. Each of these aspects of the present invention will be developed more fully below.

As depicted in FIG. 1, pointing device 100 is shown comprising motion translation unit 102, user selection unit 104 and, in accordance with a first aspect of the present invention, one or more physiological response sensors 106 each communicatively coupled to communication interface 108. In accordance with the illustrated example embodiment of FIG. 1, communication interface 108 communicates with a host device (not shown) via communication channel 112. In the illustrated example embodiment, motion translation unit 102 and user selection unit 104 communicate with communication interface 108 via a common bus. In an alternate embodiment, separate dedicated busses may be used, while in another embodiment, motion translation unit 102, user selection unit 104 and the one or more physiological response sensor(s) 106 may all share a common bus.

Except for the integration of one or more physiological response sensors 106, pointing device 100 is intended to represent any of a number of alternative pointing devices employed for the control of a host system Accordingly, pointing device 100 may well be a mouse, a trackball, a joystick, a touchpad, a stylus, an electronic pen, or any combination thereof, in which one or more physiological response sensors have been incorporated to provide a host system with physiological response information of the user. Those skilled in the art will appreciate that the particular form of the motion translation unit 102, user selection unit 104 and the physiological response sensor(s) 106 may vary based on the genre of the pointing device. Insofar as the function of motion translation unit 102 and user selection unit 104 are well known, they are only briefly described below.

As introduced above, in accordance with a first aspect of the present invention, pointing device 100 includes one or more physiological response sensors 106. In accordance with this aspect of the present invention, physiological response sensor(s) 106 are intended to represent any of a number of alternative devices which measure any of a number of physiological responses of a user who contacts the sensor(s) 106. Examples of such physiological responses include Galvanic Skin Response (GSR), heart rate, blood pressure, muscle tension, skin temperature, heart activity (e.g., rhythm), brain activity, and the like. Examples of sensors for measuring and communicating such information may include a GSR sensor, an electromyograph (muscle tension), electrocardiograph (heart activity), electroencephalograph (brain activity), thermometer (skin temperature), blood pressure sensor, and the like. One example of a suitable physiological response sensor 106 is the GSR/TEMP2 sensor from Thought Technology Corp. of Montreal, Quebec Canada, which measures the Galvanic Skin Response and temperature of a user. Another example of a suitable physiological response sensor 106 is the Electromyograph (EMG) sensor, also available from Thought Technology Corp., for measuring the muscle tension of a user. Accordingly, those skilled in the art will appreciate that any of a number of suitable alternative physiological response sensors may be used, depending on the breadth and complexity of the physiological information sought.

With continued reference to FIG. 1, motion translation unit 102 measures and communicates positional change information of the pointing device to a communicatively coupled host system as a user manipulates pointing device 100. In one embodiment, for example, motion translation unit 102 provides a host system two-dimensional positional change information via communication interface 108 and communication channel 112 as a user manipulates pointing device along an x-y plane. In an alternate embodiment, motion translation unit 102 provides a host system with three-dimensional positional change information as a user manipulates pointing device in a three-dimensional space. Any of a number of alternative motion translation units are well known in the art and, thus, need not be further described here.

User selection unit 104 is intended to represent any of a number of user selection units known in the art which enable a user to select an object (e.g., a file) or a menu function within the graphical user interface (GUI) of the host system. Suitable examples of user selection unit 104 include momentary contact buttons, switches, contact buttons, and the like. As with motion translation unit 102, user selection units are well known in the art and thus, need not be further described.

Communication interface 108 is also intended to represent any of a number of such devices known in the art. Communication interface 108 receives control signal(s) from motion translation unit 102, user selection unit 104 and physiological response sensor(s) 106 and communicates this information to an input port of the host system. In one embodiment, this information is communicated to the host system at 30 Hz, while in an alternate embodiment, this information is communicated to the host system at 60 Hz. In one embodiment, the information is communicated to host system only upon receiving a command from host system, e.g., an application driven request for information. In addition, communication interface 108 may receive control signals from a host system via communication channel 112.

Those skilled in the art will appreciate that communication interface 108 is representative of any of a number of alternative communication interfaces known in the art. That is, communication interface 108 may well be a Universal Serial Bus (USB) interface, a PS/2 interface, a serial bus interface, a parallel bus interface, SCSI bus interface, game port, and the like, depending on the communication standard used by communication channel 112. In one embodiment, communication interface 108 is modifiable to any communication standard, based on control signals received from a communicatively coupled host system. In one embodiment, communication interface 108 adheres to 5-byte serial packet encoding commonly referred to as the "C" protocol. In an alternate embodiment, communication interface 108 adheres to a 3-byte serial packet encoding scheme commonly referred to as the "M" protocol, developed by Microsoft® Corporation of Redmond, Wash. In one embodiment, communication interface 108 adheres to a modified "M" protocol referred to as the M+ protocol which offers an optional fourth byte to the three-byte standard M protocol. In one embodiment, physiological response information is transmitted in the optional fourth byte of the M+ protocol.

In one embodiment, pointing device 100 may also include a controller (not shown) receiving input from motion translation unit 102, user selection unit 104 and physiological response sensor(s) 106 to process the raw information prior to communication to the host system via communication interface 108 and communication channel 112. In this regard, the controller may well be an application specific integrated circuit (ASIC), programmable logic device (PLD), processor, microcontroller, digital signal processor (DSP), and the like. In one embodiment, for example, controller is an 8042 controller from Intel Corp., of Santa Clara, Calif. In accordance with one embodiment of the present invention, the controller receives positional change information, user selection information and physiological change information from motion translation unit 102, user selection unit 104 and physiological response sensor(s) 106, respectively, to generate a composite control signal which is communicated to a communicatively coupled host system via communication interface 108 and communication channel 112. In an alternate embodiment, the controller does not generate a composite signal, but rather provides a host system with individual positional change, user selection and physiological response signals. In one embodiment, the controller monitors the physiological response information locally, sending a signal to the host system to update the operating environment only when a significant change in the physiological response information is noted. Such an embodiment would reduce the amount of information that must be transmitted over communication interface 112, thereby reducing the its bandwidth requirement. In one embodiment, the controller and communication interface 108 may well be integrated within a single device.

Communication channel 112 may well be any of a number of alternative wireline or wireless communication channel's known in the art. In one embodiment, for example, communication channel 112 is a wireline communication channel adhering to the USB specification. In an alternate embodiment, communication channel 112 is an infrared wireless interface. Further, although depicted as a single channel, those skilled in the art will appreciate that communication channel 112 may well be a number of a communication channels through which positional change information, user selection information and physiological response information is communicated to a host system. In one embodiment, for example, communication channel 112 represents two communication media, the first of which facilitates the communication of positional change and user selection information, while the second facilitates the communication of physiological response information. In an alternate embodiment, a single communication media is employed to facilitate the communication of all signals.

Given the foregoing description, those skilled in the art will appreciate that innovative pointing device 100 with integrated physiological response sensor(s) 106 facilitates the multivariate control of a host computer system heretofore unavailable in a single pointing device. However, those skilled in the art should appreciate that the illustrated example embodiment of FIG. 1 is just that—an example embodiment. Any number of alternative configurations with greater or lesser functional blocks may well be practiced without deviating from the spirit and scope of the present invention. Accordingly, such alternate embodiments are anticipated by the teachings of the present invention.

Figure 2:
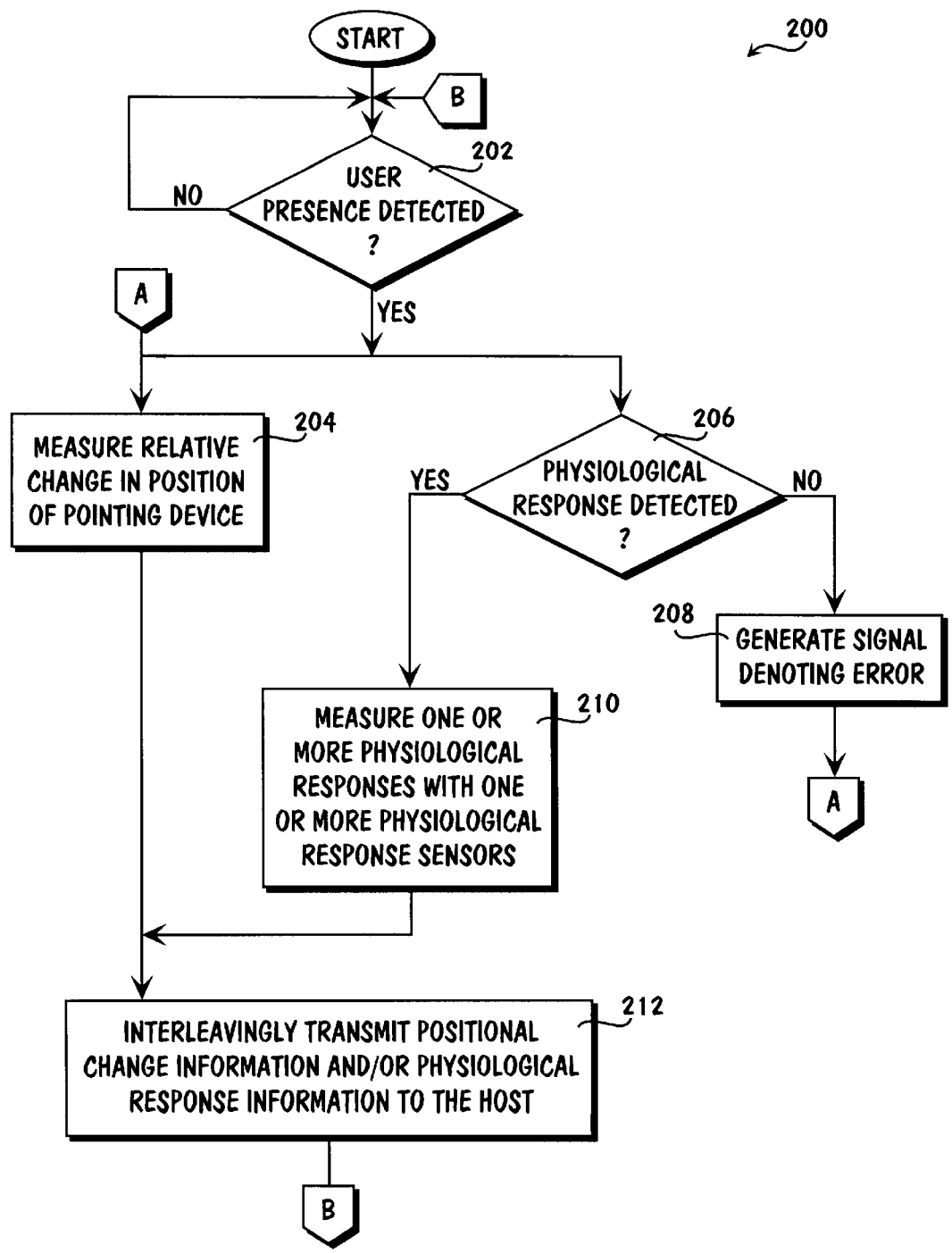
FIG. 2 illustrates a flow chart of an example method for controlling a host system with physiological response information acquired via a pointing device incorporating the teachings of the present invention, in accordance with one embodiment of the present invention.

Having introduced the architectural structure of a pointing device incorporating the present invention with reference to FIG. 1, attention is now directed to the flow chart depicted in FIG. 2, wherein the operation of just such a device is presented, in accordance with one embodiment of the present invention. That is, FIG. 2 provides a flow chart of an example method of operation of a pointing device with integrated physiological response sensors, in accordance with one embodiment of the present invention. Accordingly, the method of FIG. 2 will be developed with continued reference to example pointing device 100 incorporating the teachings of the present invention.

With reference to FIG. 2, the method begins when a user's presence is detected, block 402. Prior art pointing devices would detect a user's presence via the motion translation unit or the user selection unit, e.g., when the pointing device was moved, or when a momentary contact button was pressed. Those skilled in the art will appreciate, however, that pointing device 100 incorporating the teachings of the present invention may detect a user's presence via the one or more physiological response sensor(s) 106, in addition to motion translation unit 102 and user selection unit 104. That is, a user's presence may be detected simply by a user gripping pointing device 100.

If, at block 202, a user's presence is detected, the method continues down parallel paths wherein, at block 204, motion translation unit measures any detectable change is the relative position of pointing device 100. In addition, user selection unit 104 operates to provide user selection information. The positional change information and the user selection information, if any, is provided to communication interface 108 in block 204.

In parallel, having detected a user's presence, a determination is made of whether any physiological response has been detected, block 206. That is, pointing device driver 406 determines whether physiological response sensor(s) 106 are providing any physiological response information. The lack of physiological response information may be indicative of a failure of one or more of the physiological response sensor(s) 106. Alternatively, the lack of physiological response information may be indicate that the user is not making sufficient contact with pointing device 100 to enable the one or more physiological response sensor(s) to acquire the physiological response information. Accordingly, at block 208, an indication is provided by pointing device driver 406 to the operating system 408 or an application 410 denoting an error. Given the error indication, the host device may prompt the user to move their hand into a better position, or that pointing device may need service. Having issued an error signal to the host system, pointing device 100 may nevertheless continue to provide positional change information and user selection information from motion translation unit 102 and user selection unit 104, respectively, block 204.

If, however, a physiological response is detected at block 206 physiological response sensor(s) 106 measure one or more physiological responses, block 210. In one embodiment, a first subset of physiological response sensor(s) 106 measure a first physiological response, while a second subset of physiological response sensor(s) 106 measure a second physiological response, while a third subset of physiological response sensor(s) measure yet a third physiological response of the user. In one embodiment, for example, physiological response sensor(s) 106 measure the Galvanic Skin Response and temperature of the user. In an alternate embodiment, for example, physiological response sensor(s) 106 measure the blood pressure, heart activity and brain activity of the user. Those skilled in the art will appreciate, based on the foregoing, that numerous variations of physiological responses may be measured depending, of course, on the number and sophistication of the physiological response sensor(s) 106 deployed within pointing device 100. At block 210, the physiological response information detected by physiological response sensor(s) 106 is provided to communication interface 108.

At block 212, communication interface 108 transmits control information to the host system via communication channel 112, as described above. In one embodiment of the present invention, for example, collection of physiological response information via physiological response sensor(s) 106 may take some time, however, the representation of positional change information obtained from the motion translation unit 102 must be depicted within the graphical user interface in substantially real-time to be useful. Thus, communication interface 108 provides information to the host system as it becomes available. If there is contention, i.e., information from each of motion translation unit 102, user selection unit 104 and physiological response sensor(s) 106 arrive simultaneously, the control information is interleavingly supplied to the host system in accordance with predetermined priority. In one embodiment, for example, the information is provided on a first come, first served basis. In an alternate embodiment, motion translation unit 102 has a higher priority than physiological response sensor(s) 106, while user selection unit 104 enjoys the highest priority level of the three. In accordance with the illustrated example embodiment, the method loops infinitely while user presence is detected.

Figure 3:
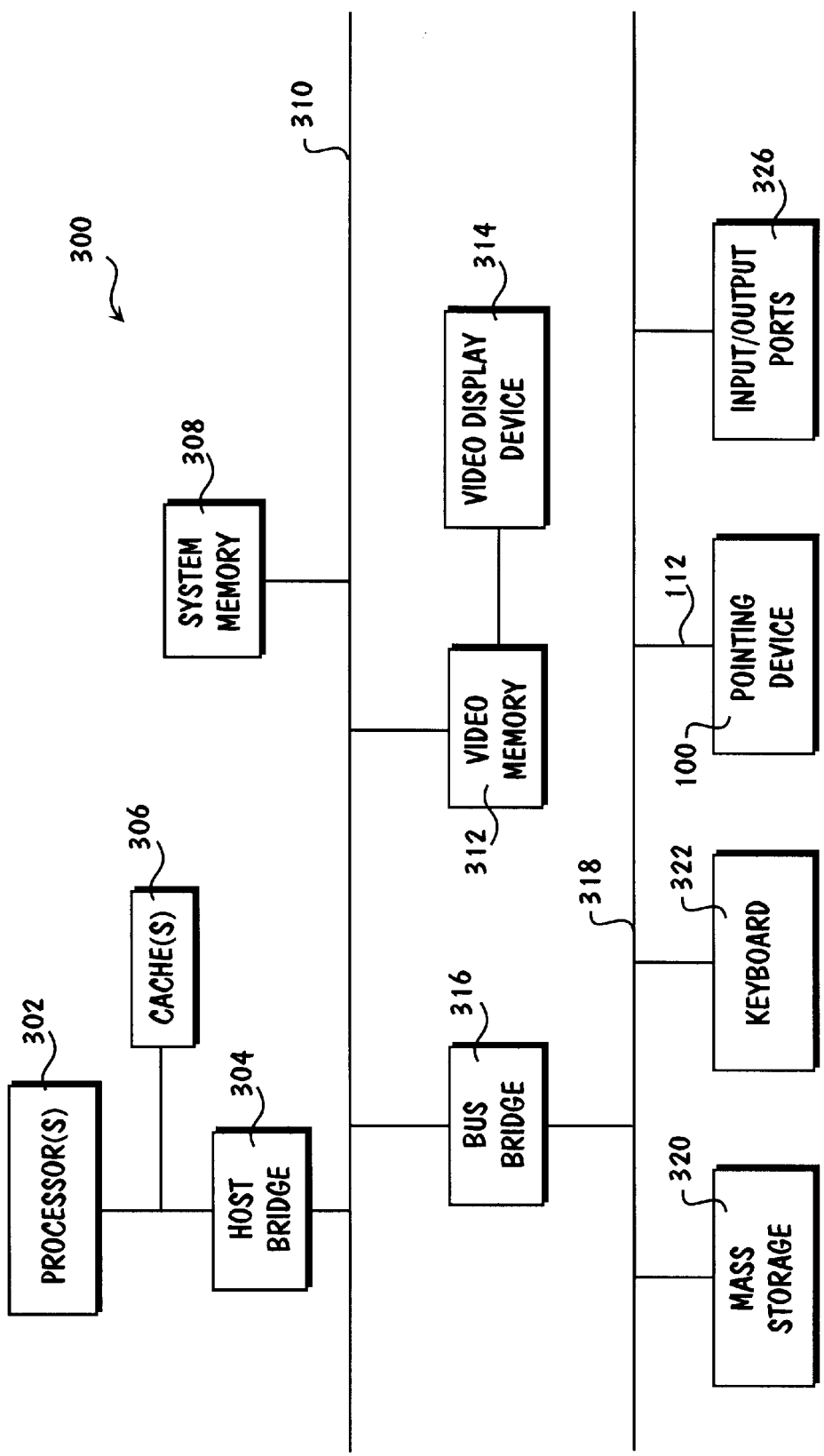
FIG. 3 illustrates a block diagram of an example host system employing a pointing device incorporating the teachings of the present invention, in accordance with one embodiment of the present invention.
Figure 4:
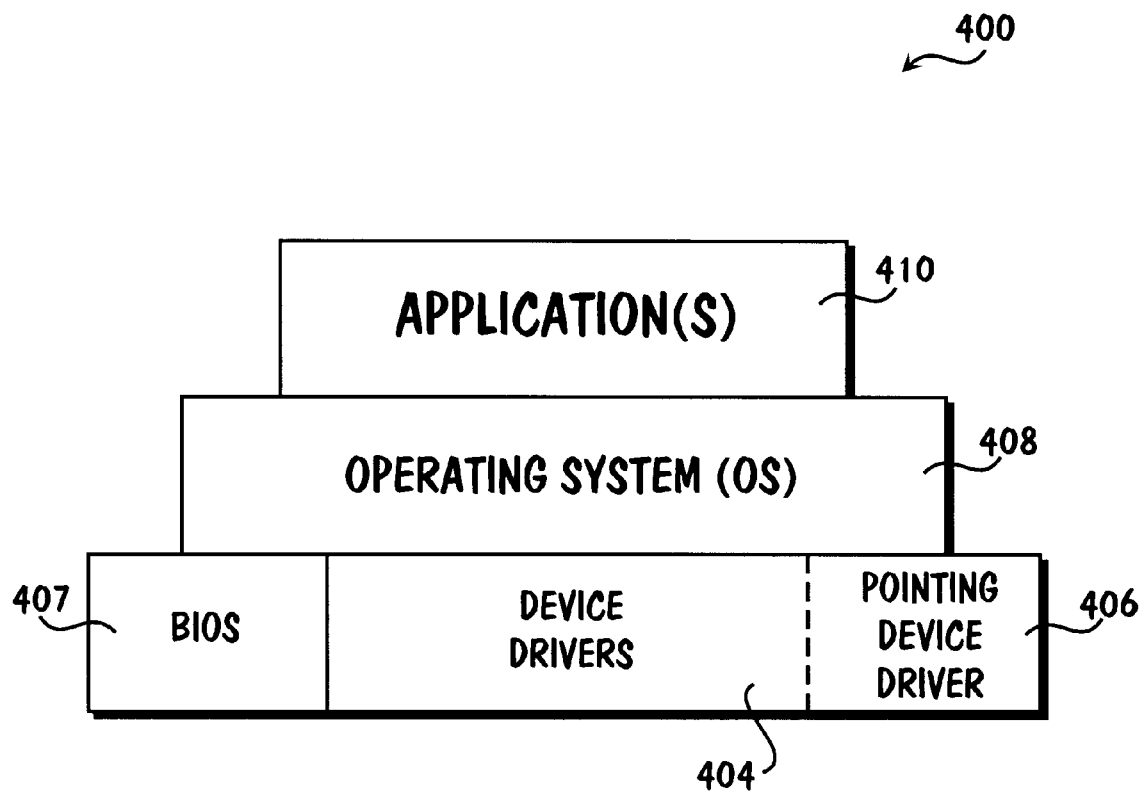
FIG. 4 illustrates a block diagram of an example software architecture for the host system of FIG. 3 incorporating the teachings of the present invention, in accordance with one embodiment of the present invention.

Having described the architectural structure of the present invention in accordance with FIG. 1, and an example of its operation with respect to FIG. 2, an example operating environment will be developed with further reference to FIGS. 3 and 4. More specifically, FIG. 3 illustrates a block diagram of an example host system incorporating the teachings of the present invention, while FIG. 4 provides a block diagram of a software architecture of the host system incorporating the teachings of the present invention.

Turning to FIG. 3, a block diagram of an example host system 300 incorporating the teachings of the present invention is depicted. In accordance with the illustrated example embodiment, host system 300 is depicted comprising one or more processors 302 with associated cache(s) 306 and host bridges 304 coupling processor(s) 302 to a high speed input/output (I/O) bus 310. In addition, system memory 308, video) memory 312 and bus bridge 316 are also communicatively coupled to high speed I/O bus 310, as depicted. As shown, bus bridge 316 couples high speed I/O bus 310 to another, typically I/O, bus 318. In accordance with the illustrated example embodiment of FIG. 3, host system 300 also includes mass storage device 320, keyboard, I/O ports 326 and, pointing device 100. Pointing device 100 incorporating the teachings of the present invention is shown coupled to I/O bus 318 via communication channel 112. In one embodiment of the present invention, pointing device 100 is coupled to standard I/O bus 318 with a serial communication interface cable, while in alternate embodiments it may be communicatively coupled with an infrared (IR) interface or a radio-frequency (RF) interface.

With continued reference to FIG. 3, elements 302–326 perform their conventional functions as known in the art. In particular, mass storage device 320 is used to provide permanent storage for the data and programming instructions to implement the above described functions, whereas system memory 308 is used to provide temporary storage for the data and programming instructions when executed by processor(s) 302. I/O ports 326 are one or more serial and/or parallel communication ports used to provide communication between additional peripheral devices which may be coupled to host system 300. Thus, those skilled in the art will appreciate that, except for pointing device 100 incorporating the teachings of the present invention, host system 300 is intended to represent any of a number of alternative well known host systems, including but not limited to general purpose computer systems based on the Pentium® processor, the Pentium® Pro processor, or the Pentium® II processor commonly available from Intel Corporation of Santa Clara, Calif.

Further, it is to be appreciated that various components of host system 300 may be rearranged, or practiced with greater or lesser functional blocks without deviating from the spirit and scope of the present invention. For example, the peripheral devices shown coupled to standard I/O bus 318 may, in alternate embodiments, be coupled to high performance I/O bus 310; in addition, in some implementations only a single bus may exist with the components of host system 300 being coupled to the single bus.

In accordance with one aspect of the present invention, the innovative features of the present invention are utilized by software routines run by host system 300 of FIG. 3. These software routines run a plurality or series of instructions to be executed by a processor, such as processor(s) 302 in host system 300. Initially, the series of instructions are stored on a storage device, such as mass storage device 320. It is to be appreciated that the series of instruction may be stored on any conventional storage device, such as a diskette, CD ROM, magnetic tape, DVD, laser disk, ROM, flash memory, etc. It is also to be appreciated that the series of instruction need not be stored locally, and could be received from a remote storage device, such as a server on a network, via I/O ports 326. The instructions are copied from the storage device, such as mass storage device 320, into system memory 314 and then accessed and executed by processor(s) 302. In alternate embodiments, the functional routines used to interface innovative pointing device 100 with host system 300 may be implemented in discrete hardware or firmware. For example, an application specific integrated circuit (ASIC) could be programmed with the above described functions of the present invention.

Turning to FIG. 4, a block diagram of an example software architecture implemented on host system 300 depicting one embodiment of the software routines necessary to interface pointing device 100 with host system 300, in accordance with one embodiment of the present invention. In accordance with the illustrated example embodiment of FIG. 4, software architecture 400 is shown comprising a plurality of applications 410, operating system 408, basic input/output system (BIOS) 407, device drivers 404, including pointing device driver 406 used to interface host system 300 with pointing device 100 incorporating the teachings of the present invention.

As depicted herein, applications 410 are intended to represent any of a number of specialty applications known in the art which are executable by host systems. Similarly, operating system 408 is also intended to represent any of a number of alternative general operating systems known in the art. Basic input/output system (BIOS) 407 provides an interface between operating system 408 and the various input/output (I/O) devices coupled to the hardware system. Those skilled in the art will appreciate that execution of operating system 308 is initiated from within BIOS 407, and therefore is depicted as supporting OS 408. Operating system 408 is a general software service which provides an interface between BIOS 407 and applications 410, if any, being executed by host system 300. Operating system 408 also provides an interface, such as a graphical user interface (GUI), between the user and host system 300. According to one embodiment of the present invention, operating system 408 is the Windows™ 95 operating system, available from Microsoft Corporation of Redmond, Wash. However, it is to be appreciated that the present invention may be used with any other conventional operating system, such as other versions of Microsoft Windows™ (for example, Windows™ 3.0, Windows™ 3.1, Windows™ NT, or Windows™ CE), Microsoft DOS, OS/2, available from International Business Machines Corporation of Armonk, N.Y., the Apple Macintosh Operating System, available from Apple Computer Incorporated of Cupertino, Calif., the NeXTSTEP® operating system available from Apple Computer Incorporated, or the UNIX operating system, available from Santa Cruz Operations of Santa Cruz, Calif.

Device drivers 404, including pointing device driver 406, provide the interface necessary to enable operating system 408 to communicate with physical I/O devices such as, for example, innovative pointing device 100 incorporating the teachings of the present invention. In accordance with one aspect of the present invention, pointing device driver 406 includes instructions for receiving control signals from pointing device 100, identifying positional change information, user selection information and physiological response information, and providing such information to operating system 408 which uses such information to control the operating environment of host system 300. In one embodiment, execution of device drivers 404 are also initiated by BIOS 407.

Figure 5:
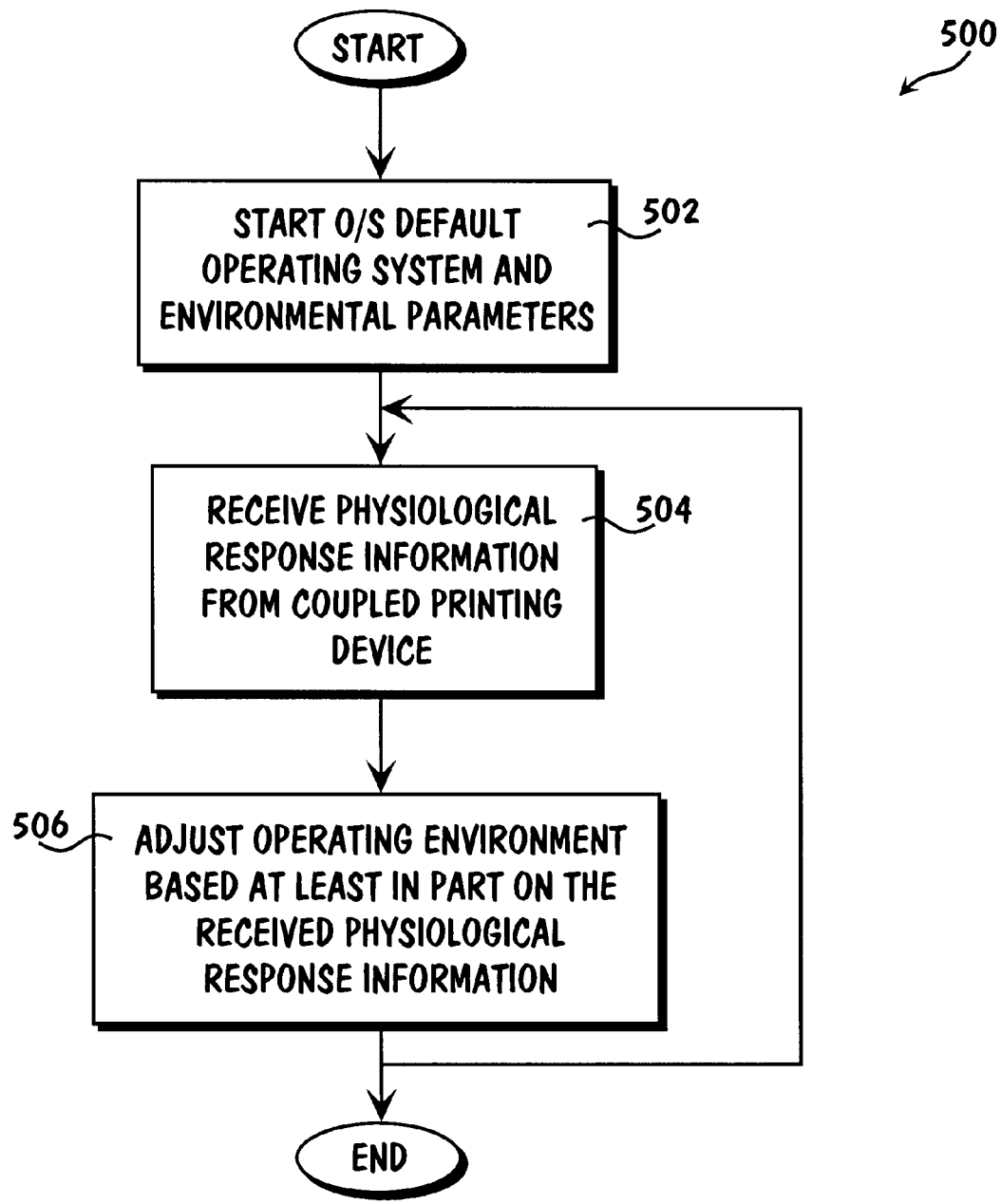
FIG. 5 illustrates a flow chart of an example method for controlling the operating environment of a host system incorporating the teachings of the present invention, in accordance with one embodiment of the present invention.

Having described innovative pointing device 100 incorporating the teachings of the present invention with reference to FIGS. 1–4, a second aspect of the present invention will now be developed with reference to FIGS. 5 and 6.

Turning to FIG. 5, a flow chart illustrating an example method for controlling the operating environment of a host system is presented, in accordance with one embodiment of the present invention. As depicted, the method begins upon start-up of the host system, e.g. host system 300. As the operating system, e.g., operating system 408 loads, a default operating environment for host system 300 is created. Those skilled in the art will appreciate that the operating environment is used to describe the background of the video display, the screen saver, if any, deployed, as well as the audio tones/prompts utilized by OS 408 to interface with the user of host system 300. In addition, host systems with multimedia capability may also provide background music as part of the operating environment generated for the user of the host system. Typically, the default operating environment is manually prepared by the user of host system 300. In accordance with the teachings of the present invention, a user may also designate alternate operating environments for use when host system 300 detects that the user is becoming stressed, lethargic, anxious, sleepy, fatigued, and the like. In an alternate embodiment of the present invention, host system will automatically designate modified operating environments for the user by modifying certain aspects of the default operating environment.

Thus, the method begins as the user starts host system 300 and the default operating environment is loaded, block 502. In accordance with the teachings of the present invention, the pointing device of host system 300 includes one or more physiological response sensors to measure the physiological response of the user of host system 300. In one embodiment of the present invention, host system 300 utilizes pointing device 100 incorporating the teachings of the present invention. Accordingly, as the user interfaces with host system 300 via pointing device 100, the one or more physiological response sensors 106 measure and report on the physiological state of the user. Thus, in block 504, host system 300 receives physiological response information from the one or more physiological response sensors 106 via communication channel 112 and pointing device driver 406. In accordance with the second aspect of the present invention, operating system 408 adjusts the operating environment of the host system 300 based, at least in part, on the received physiological response information. In one embodiment of the present invention, for example, operating system relies on a database to denote which operating parameters to adjust based on a composite physiological response "score". In one embodiment of the present invention, the composite physiological response score is calculated locally, at the pointing device incorporating the teachings of the present invention. In an alternate embodiment, host system 300 calculates the physiological response score from raw physiological response information received from a pointing device incorporating the teachings of the present invention. The method of FIG. 6 loops back to 604 and the method continues in this fashion until host system 300 is turned off.

One example of suitable database is presented with reference to FIG. 6. That is, FIG. 6 graphically illustrates the content of an example database utilized by operating system 408 incorporating the teachings of the present invention to modify the operating environment of host system 300 based, at least in part, on the physiological state of the user of host system 300. In accordance with the illustrated example embodiment of FIG. 6, the physiological score of a user ranges from a low of one 609 to a high of ten 618, wherein each score has an associated background 604, screen saver 606 and audio selection 608 associated with it. For example, a physiological response score of one 609 denotes that the user is stressed, or anxious. Accordingly, operating system 408 incorporating the teachings of the present invention adjusts the operating environment of host system 300 to try and soothe the user. In one embodiment, for example, the background is modified to depict flying birds 610, the screen saver is audio/video of a nice fire burning in a brick fireplace 612, and the audio selections of the operating environment is that of a placid bubbling brook 614. That is, the operating environment is altered based, at least in part, on the received physiological response information to try and calm the user.

Alternatively, if operating system 408 determines that the user is becoming lethargic, denoted in database 600 by a physiological response score of ten 618, the background is modified to depict an exciting sailing scene 620, the screen saver provides audio/video of exciting skiing video 622, while the audio selections are excerpts from a rock concert 624. Those skilled in the art will appreciate that the audio/video selections may well be stored locally on host system on mass storage device 320, or remotely accessed via input/output ports 326.

Although the present invention has been described, above, as continuously providing physiological response information, and updating the operating environment accordingly, those skilled in the art will appreciate that a number of alternate embodiments exist. For example, operating system 408 or an application 410 executing on host system 300 could prompt pointing device 100 incorporating the teachings of the present invention to measure and communicate physiological response information on demand, father than the continuous monitoring described above. Thus, such alternative embodiments are anticipated as being within the spirit and scope of the present invention.

Having introduced certain aspects of the present invention above with reference to FIGS. 1–6, a number of alternative pointing devices incorporating the teachings of the present invention are presented in FIGS. 7–10.

Figure 7:
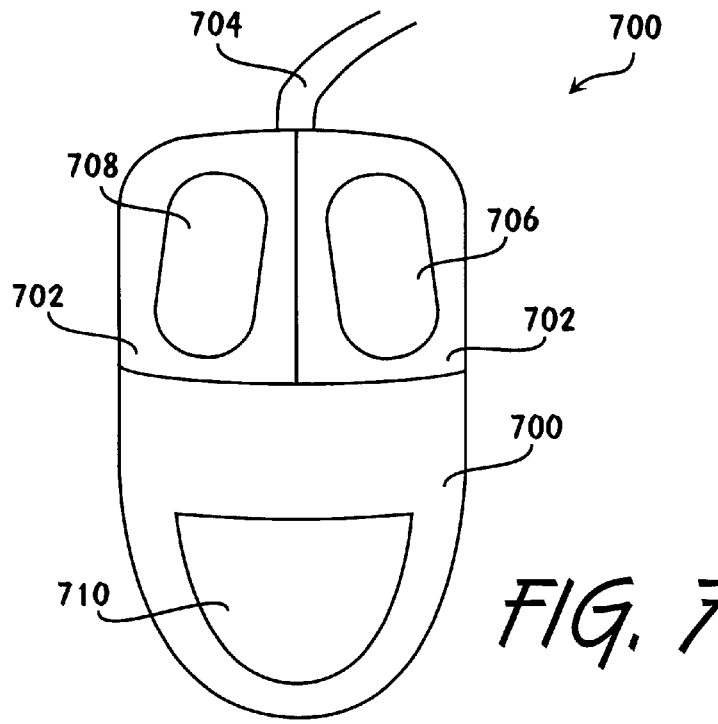
FIGS. 7, 8, 9 and 10 each provide a graphical representation of alternate embodiments of a pointing device incorporating the teachings of the present invention.

Turning to FIG. 7, an example mouse pointing device 700 incorporating the teachings of the present invention is depicted. In accordance with the illustrated example embodiment of FIG. 7, mouse 700 is depicted comprising two user selection units 702, a base 700, communication channel 704 and one or more physiological response sensors 706, 708 and 710. Not shown is motion translation unit, which is obstructed from this view within mouse 700.

As depicted in FIG. 7, mouse 700 incorporates three physiological response sensor(s) 706–710, in accordance with the teachings of the present invention. In the illustrated example embodiment, physiological response sensor(s) 706 and 708 are located within user selection unit 702, while physiological response sensor 710 is located within base 700. Those skilled in the art will appreciate that alternate mouse configurations of the present invention may be practiced with greater or lesser physiological response sensors without deviating from the spirit and scope of the present invention, and such modifications are anticipated by this disclosure.

Figure 8:
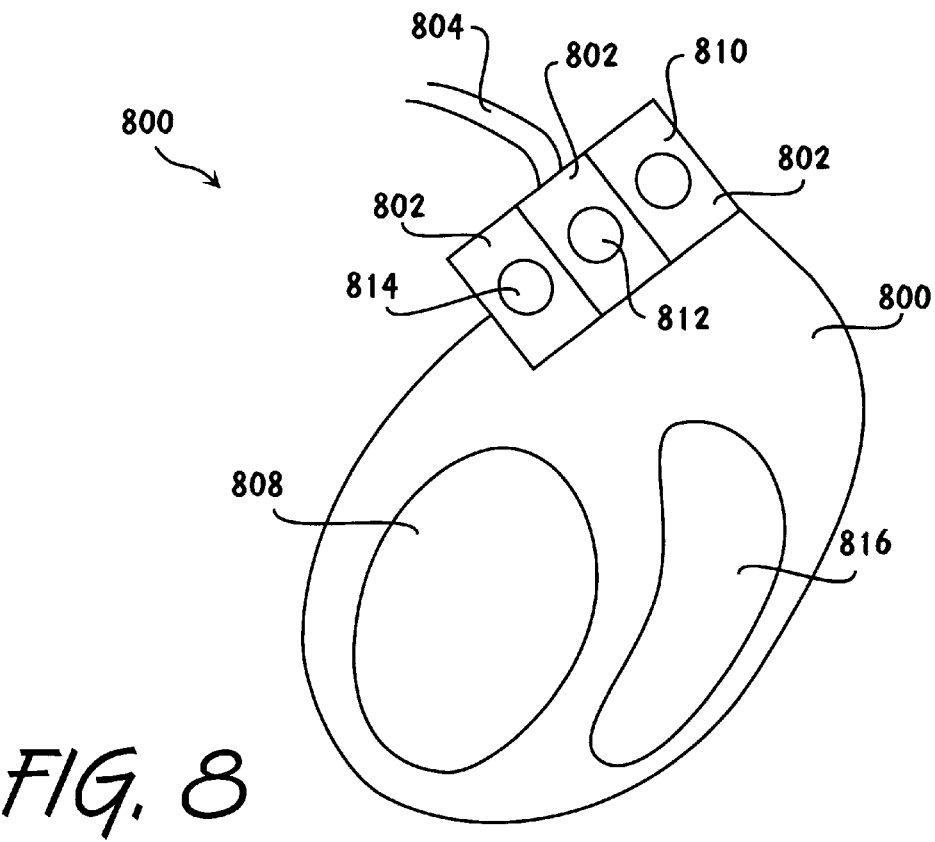

FIG. 8 graphically illustrates an example trackball pointing device 800 incorporating the teachings of the present invention. In particular, trackball 800 includes motion translation unit 808, user selection units 802, communication channel 804 and one or more physiological response sensors 810–816. In accordance with the illustrated example embodiment of FIG. 8, four physiological response sensors are deployed within trackball 800, three physiological response sensor(s) 810, 812 and 814 are deployed within user selection units 802, while a fourth physiological response sensor 816 is deployed within the base of trackball 800 where a user's hand would typically rest while manipulating motion translation unit 808.

Figure 9:
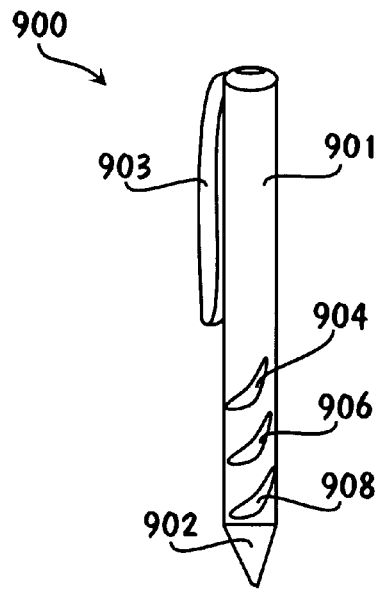

FIG. 9 depicts an electronic pen 900 incorporating one or more physiological response sensors 904–908 in the base 901 of pen 900. In accordance with the illustrated example embodiment of FIG. 9, electronic pen 900 communicates with a host system via a radio-frequency (RF) transceiver (not shown) located within pen 900. Placement of physiological response sensors 904–908 within the base 901 of pen 900 is designed to coincide with the typical placement of a user's fingers directly above the writing point 902.

Figure 10:
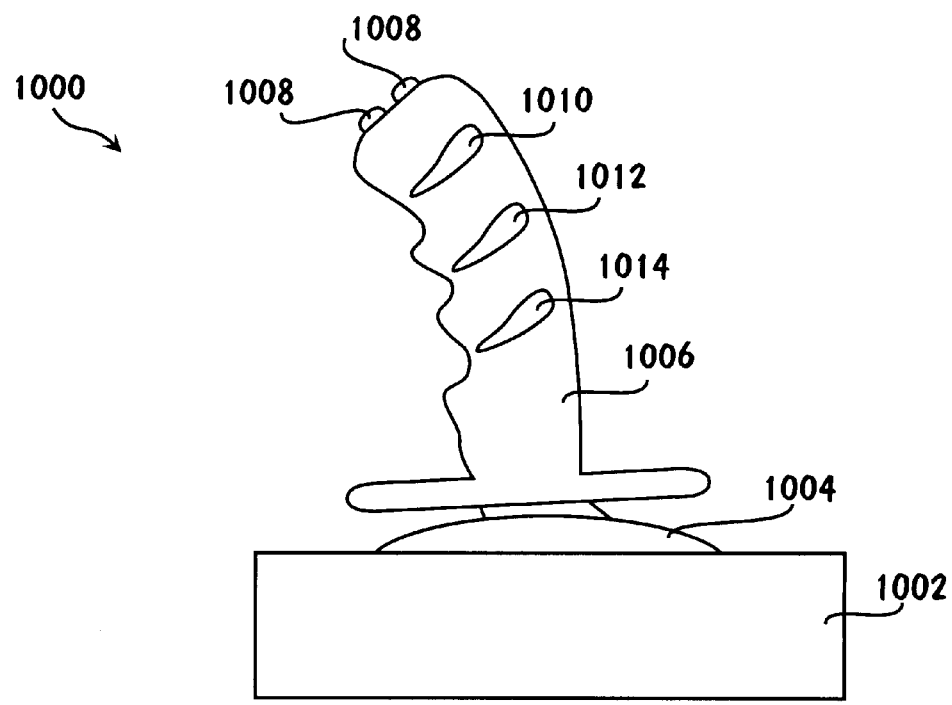

FIG. 10 graphically illustrates an example joystick 1000 incorporating the teachings of the present invention. As depicted, joystick 1000 is shown comprising base 1002, motion translation unit 1004, control shaft 1006 and user selection units 1008. In accordance with the teachings of the present invention, joystick 1000 is shown comprising one or more physiological response sensor(s) 1010–1014 embedded within control shaft 1006. In an alternate embodiment, physiological response sensor(s) 1010–1014 may be replaced or supplemented with physiological response sensors embedded within base 1002 or user selection units 1008.

While the innovative features of pointing device 100 with integrated physiological response sensors has been described in terms of the above illustrated embodiments, those skilled in the art will recognize that the invention is not limited to the embodiments described. The present invention can be practiced with modification and alteration within the spirit and scope of the appended claims. In particular, the present invention may be practiced with other features and/or feature settings. Particular examples of other features include but are not limited to transaction communication protocols and architectural attributes. Accordingly, the description is to be regarded as illustrative instead of restrictive on the present invention.

Thus, alternative embodiments of a pointing device with integrated physiological response detection facilities has been described.

What is claimed is:

1. A pointing device comprising:
   a motion translation unit to identify the pointing device's positional changes; and
   at least one physiological response sensor selected from a group consisting of an electromyograph, an electrocardiograph, an electroencephalograph, a thermometer and a blood pressure sensor to detect and communicate at least one corresponding physiological responses of a user of the pointing device.

2. The pointing device of claim 1, wherein the pointing device further comprises a communication interface to communicate the pointing device's positional change information and the at least one corresponding physiological responses to a host system via a common communication channel communicatively coupling the pointing device to the host system.

3. The pointing device of claim 1, wherein the pointing device further comprises a Galvanic Skin Response (GSR) sensor to detect the user's Galvanic Skin Response.

4. The pointing device of claim 1, wherein the pointing device comprises two or more physiological response sensors selected from said group to detect two or more corresponding physiological response information, and means to compute a composite physiological response score.

5. The point device of claim 2, wherein the communication interface is of a type selected from a group consisting of a wired communication interface and a wireless communication interface.

6. The pointing device of claim 5, wherein the communication interface is a wired communication interface selected from a group consisting of a serial port communication interface, a PS/2 communication interface, a Universal Serial Bus (USB) communication interface, a SCSI communication interface, a parallel port communication interface, and a game port communication interface.

7. The pointing device of claim 5, wherein the communication interface is a wireless communication interface selected from a group consisting of an IR wireless and an RF wireless communication interface.

8. The pointing device of claim 1, wherein the pointing device is of a type selected from a group consisting of a mouse, a trackball, a joystick, a stylus, and an electronic pen.

9. A computer system comprising:
   a processor; and
   a pointing device, communicatively coupled to the processor to provide cursor control and physiological inputs for the processor, the pointing device including, a motion translation unit to identify the pointing device's positional changes; and at least one physiological response sensor selected from a group consisting of an electromyograph, an electrocardiograph, an electroencephalograph, a thermometer and a blood pressure sensor to detect at least one corresponding physiological response of a user of the pointing device.

10. The computer system of claim 9, wherein the pointing device comprises of two or more physiological sensors selected from the group to detect two or more corresponding physiological responses, and the pointing device further comprises means for computing a composite physiological score for the two or more corresponding physiological responses.

11. The computer system of claim 9, wherein the pointing device comprises of two or more physiological sensors selected from the group to detect two or more corresponding physiological responses, and the computer system further comprises programming instructions to be executed by the processor to compute a composite physiological score for the two or more corresponding physiological responses.

12. The computer system of claim 9, wherein the pointing device further comprises a Galvanic Skin Response sensor to detect the user's Galvanic Skin Response.

13. An apparatus comprising:

at least one input port to receive at least one corresponding physiological response collected from at least one physiological response sensor selected from a group consisting of an electromyograph, an electrocardiograph, an electroencephalograph, a thermometer and a blood pressure sensor, and integrated within a communicatively coupled pointing device; and an execution unit, coupled to the at least one input port, to modify an operating environment of the apparatus based, at least in part, on the at least one corresponding physiological response received from the pointing device.

14. A computer system comprising:

a storage device having stored therein a plurality of programming instructions; and an execution unit, coupled to the storage device, to execute the plurality of programming instructions to control operation of the computer system, including user perceivable outputs, in accordance with at least one corresponding physiological response automatically acquired from a user of the computer system, using at least one physiological sensor embedded in a pointing device, selected from a group consisting of an electromyograph, an electrocardiograph, an electroencephalograph, a thermometer and a blood pressure sensor.

15. The computer system of claim 14, wherein visual and/or audio attributes of an operating environment presented to the user of the computer system are automatically modified based, at least in part, on said automatically acquired at least one corresponding physiological response of the user.

16. A method for acquiring physiological response of a user of a computer system, the method comprising:

(a) detecting at least one corresponding physiological response of the user of the computer system using at least one physiological response sensor embedded within a pointing device of the computer system, selected from a group consisting of an electromyograph, an electrocardiograph, an electroencephalograph, a thermometer and a blood pressure sensor; and (b) communicating the detected at least one corresponding physiological response of the user to the computer system.

17. The method of claim 16, wherein said detecting further comprises detecting Galvanic Skin Response (GSR) of the user using a GSR sensor embedded within the pointing device.

18. The method of claim 16, wherein the detecting of (a) comprises detecting two or more of the corresponding physiological responses using two or more of the physiological sensors selected from the group, and the method further comprises (c) computing a composite physiological score for the two or more corresponding physiological responses.

* * * * *